United States Patent [19]

Solberg

[11] Patent Number: 5,766,644
[45] Date of Patent: Jun. 16, 1998

[54] PRESSURE COMPRESSION MOULD FOR THE PRODUCTION OF TIRES

[76] Inventor: Thor Solberg, Tertnesflaten 17, N-5084 Tertnes, Norway

[21] Appl. No.: 765,522
[22] PCT Filed: Jul. 3, 1995
[86] PCT No.: PCT/NO95/00119
§ 371 Date: Feb. 13, 1997
§ 102(e) Date: Feb. 13, 1997
[87] PCT Pub. No.: WO96/01181
PCT Pub. Date: Jan. 18, 1996

[30] Foreign Application Priority Data

Jul. 4, 1994 [NO] Norway ............................ 942511

[51] Int. Cl.$^6$ ............................................. B29D 30/06
[52] U.S. Cl. ........................ 425/17; 425/22; 425/24; 425/25; 425/39
[58] Field of Search ....................... 425/17, 19, 22, 425/23, 24, 25, 39

[56] References Cited

U.S. PATENT DOCUMENTS

| | | | |
|---|---|---|---|
| 2,748,423 | 6/1956 | Hawkinson | 425/22 |
| 3,135,996 | 6/1964 | Smyser | 425/22 |
| 3,135,997 | 6/1964 | Smyser | 425/22 |
| 3,492,180 | 1/1970 | Smith | 425/22 |
| 3,585,686 | 6/1971 | Balle | 425/19 |
| 3,770,858 | 11/1973 | Ireland et al. | 425/22 |
| 3,779,832 | 12/1973 | Reppel | 425/39 |
| 3,839,123 | 10/1974 | Sausaman | 156/394 |
| 3,853,666 | 12/1974 | Barefoot | 425/22 |
| 3,871,941 | 3/1975 | Wasko | 425/39 |
| 3,935,045 | 1/1976 | Wolfe | 425/17 |

*Primary Examiner*—James P. Mackey
*Attorney, Agent, or Firm*—McAulay Fisher Nissen Goldberg & Kiel, LLP

[57] ABSTRACT

The pressure compression mould for the production and/or revulcanisation of tires forms a hollow space where the pressure and the temperature can be regulated. Each sidewall of the compression mould is designed with an elastic and flexible annular disc membrane which the sidewalls of a tire placed in the mould is made to thrust against in order to control the outwardly directed tensile forces in the tire. The membrane sides facing towards the mould hollow space is equipped with an annular disc-shaped membrane-protective plate in order to prevent direct contact between side faces of the tire and the respective membranes during the production/vulcanisation. The plate is split up, both in the radial and circular plane, into a series of smaller plates the free ends of which mutually overlap each other. When a tire is placed in the mould and the mould hollow space is pressure set, the sides of the tire are pressed outwards towards the plates which flex afterwards and furthermore the membrane is flexed outwards and is stretched. Direct contact between the membrane and sides of the tire is avoided so that the sides of the tire are not vulcanised fast in the membrane.

15 Claims, 5 Drawing Sheets

1

PRESSURE COMPRESSION MOULD FOR THE PRODUCTION OF TIRES

The present invention relates to an arrangement in the production of air-filled tires.

More specifically the present invention has to do with a pressure-compression mould, that is to say a vulcanisation mould, for the vulcanisation of tires.

The present invention has especially to do with the last step, that is to say the vulcanisation step, during the production of tires, and relates particularly to the reuse of old worn down tires during the utilisation of a recapping or tread application process.

When the wearing surface of a tire is worn down, for example down towards the pattern depth which the authorities accept, the tire can be used again on recapping or applying a tread.

On recapping, the tread is completely ground away. That is to say that all the old design is completely removed down to fresh rubber and without damaging the cord in the casing. A portion of the old rubber on the sides of the tire can also be removed. By dissimilar techniques, a new unvulcanised tread can be applied. On the sidewalls there can also be deposited a thin layer of unvulcanised rubber. After the tread is applied, a flexible tube can be placed inside the tire, if desired the vulcanisation mould comprising a bellows or being tubeless. The mould is heated in advance to about ca. 150°–170° C. by conducting heated steam through ducts in the mould, if desired the mould being heated by electrical resistance heating. When the raw tire is heated and is pressed out at the same time against the walls of the mould by supplying an internal pressure, the newly applied rubber material in the tire is moulded and vulcanised, the rubber mixture being converted from a mouldable plastic material to a solid elastic material.

Vulcanising is the description of the chemical reaction which occurs between the rubber material and sulphur under the influence of high temperature and pressure. The time which is needed to complete the vulcanisation process is dependent on both the pressure, temperature and the thickness of the rubber during vulcanisation. During the day's automobile tire production, zinc oxide, stearic acid and other compounds which accelerate the vulcanisation are also added to the rubber mixture, besides sulphur.

Based on the above, there can also be used, for recapping automobile tires, factory-ready treads which are adapted for the different tire dimensions and breadths and which have a finished design and are ready vulcanised. On the finished worn down tire casing, a thin layer of unvulcanised bonding rubber is first placed, and on the outside there is drawn a sleeve (envelope). The vulcanisation itself takes place by putting the entire tire in an autoclave where it is supplied with pressure and it is heated to a temperature of ca. 98° C. Since the tread is vulcanised in advance it is only the bonding rubber which is to be vulcanised. This method is mentioned in U.S. Pat. No. 3,839,123.

When a tire is recapped thus by a heat vulcanisation as is indicated above, it is really the last step of the new tire manufacture which is repeated whereby the tread is renewed.

Even if the dimension designations and the diameters on the reconstructed tires are correct relative to the metal mould which the tires are to be vulcanised in, the volumes of the tires can be dissimilar as a consequence of variations in the length and shape of the sidewalls of the tires.

Thus, if the sidewalls of the vulcanisation mould do not agree with the sidewalls of the tire or the tire volume in this side portion, an undesirable deformation of the tire will arise during the vulcanisation. If the mould for example is dimensioned for a greater tire volume than the tire which is to be recapped, significant tensile forces will arise in the cord casing beyond those designed to be withstood. The danger is thereby great for permanent deformation of the tire to occur. This disagreement in volume between the side surface portions of the tire and the manufacturing mould leads to unfortunate deforming flows of the rubber material during the pressing.

This problem can be solved, as for example is known from DE patent publication 2,038,878, by making the sidewalls of the tire thrust against a flexible and elastically annular disc-shaped membrane which is arranged on each side of the sidewalls of the mould. Furthermore the membrane acts against an external annular groove-shaped hollow space which is recessed in the mould in which there is established a given fluid pressure, where the fluid can be for example air, P2, and the membrane will thus close accurately to the length and shape of the sides of the tire. During the vulcanisation step the pressure P2 is regulated in the hollow spaces so that the pressure here is lower the whole time than the pressure P1 in the hollow space of the mould.

With this vulcanisation mould tires which are both large and small can be vulcanised in the same mould, there being achieved a controlled tension in the sidewalls of the tire and one avoids the tire being exposed to damage from deformation.

With the arrangement is achieved limiting outwardly directed movement in the sidewalls by the cord construction of the tire, while the metal portion of the mould determines the remaining shape of the tire.

The disadvantage with this vulcanisation mould is that unvulcanised rubber, in the region which borders the membrane, does not get the desired outward flow and finish in connection with the vulcanisation. Besides the membranes have a tendency to vulcanise firmly in the unvulcanised rubber which is applied to the sidewalls of the tire before placing in the mould.

The object of the present invention is to provide an arrangement with which the afore-mentioned disadvantages in manufacture and recapping of tires can be eliminated.

The object of the present invention is to also fashion the portions which bear against sidewalls of the tire by a metallic material as in the remaining metal matrix.

Briefly, the invention is directed to a vulcanizing mould for a tire comprising a pair of mould halves defining an annular hollow space to receive a tire with each mould half having an annular cavity facing the annular space. In addition, a pair of annular elastic membranes are provided with each membrane being mounted over a cavity in a respective mould half to define a closed annular hollow space.

In accordance with the invention, a plurality of flexible non-elastic plates are mounted over each of the membranes in facing relation to the hollow space in order to face a side wall of a tire in the hollow space and thereby prevent contact between the tire side wall and a respective membrane. As such, the flexible non-elastic plates serve as protective plates to prevent the side wall of a tire being subjected to a vulcanizing process coming into contact with the flexible elastic membrane. In addition, the plates on each membrane are disposed in overlapping relation to each other in order to accommodate flexing of the membranes during a vulcanizing process.

In the following description the invention will be explained further with reference to the accompanying drawings, in which.

Figure 1:
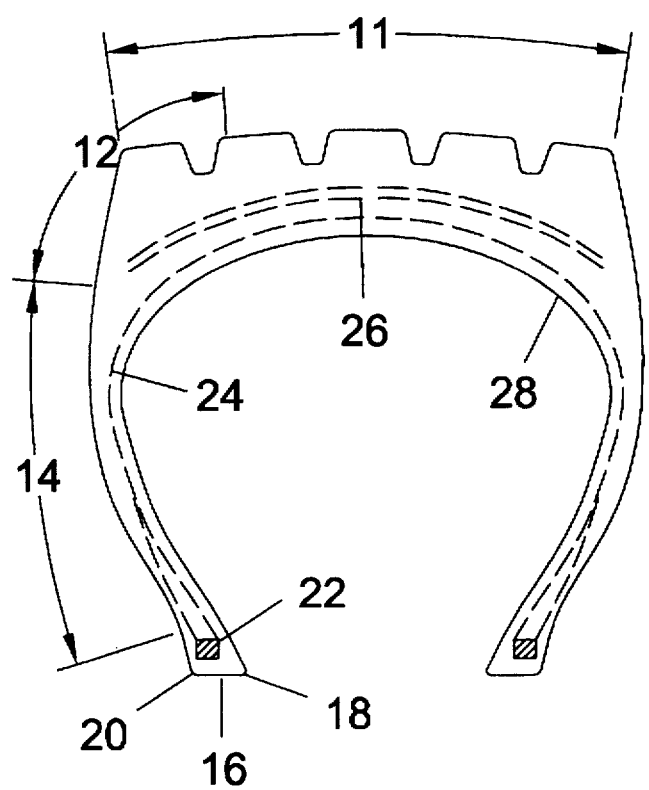
FIG. 1 shows a cross-section through a tire.

In order to better explain the significance of the present invention, the following will comprise a summing up of constructions of dissimilar tires. With reference to FIG. 1 a tire consists of a tread 11, shoulder 12, sidewall 14, a tire foot 16 with a tire toe 18, tire heel 20, wire core 22, together with cord casing 24, protective layer/breaker/belt 26 plus a sealing layer 28 when the tire is tubeless.

An automobile tire is in principle a receptacle for compressed air. It is the air which carries the load which the wheel is exposed to. The tire's own rigidity is insignificant in relation to the load it shall carry, something one sees if one is unlucky enough to have a puncture—the tire collapses instantly.

A diagonal tire consists in principle of three main portions, tread, textile skeleton and tire foot.

The unvulcanised tread is produced on a so-called tuber which operates according to the same principle as a mincing machine. The tread rubber is forced by means of a screw out through a mouthpiece which gives the tread a specific profile all according to which dimension it is to be used for. The tread passes thereafter through a cooling plant, is cut up into specific dimensions and is controlled as to quality and weight.

The rubber of an automobile tire tread and of the sidewalls of the tire usually consists of two dissimilar mixtures. The tread of the tire which later comes makes contact with the road, shall have properties which provides high wear strength. The rubber on the side, which is to form the sidewalls of the tire, shall first and foremost tolerate the constant flexing which the sides of the tire are exposed to. The preparation of these different rubber mixtures takes place in the tuber plant.

The casing is constructed of cord which are threads which consist of steel, nylon, rayon or other fibres.

Before the cord is built into the tire, it is covered with rubber. This is carried out by pressing the threads, together with the rubber mixture, between steel rolls in a calender which is a machine for smoothing and pressing. It is very important that the rubber penetrates well in between the cord threads so that each thread becomes wrapped in rubber. Otherwise the threads will gradually be able to be rubbed in pieces at the points of intersection. The covered cord will later be cut up into specific breadths at a specific angle.

The third main component of the tire is the tire foot. Several different types of tire foot are used, but common to them is that they consist of steel threads which are covered with a layer of brass (copper/zinc). The individual threads are collected for a thread core where the number of individual threads can vary in breadth. The thread core is covered with rubber, after which it is spun up on a steel wheel the diameter of which is dependent on the tire dimension the thread is to be used for.

In a diagonal tire the casing consists of two or more layers of cord. The innermost layer is laid so that the threads extend obliquely over the tire at a specific angle to the centre line of the tread, usually ca. 32°–36°. The next layer is laid so that the threads cross the preceding layer and form the same cord angle with the centre line of the tread.

A radial tire is constructed and built up in another way from the diagonal tire. In the casing of the tire of a private automobile, rayon cord is usually employed, while belt layers of steel cord are employed. In truck tires, steel cord is employed both in the casing and in the belt layers. In the radial tire, the cord threads of the casing form an angle of ca. 90° with the centre line of the tread. The radial tire is built up with one or two layers in the casing. Between the tread and the casing of the tire there is placed a rigid belt. This belt consists of 2–4 layers of cord. The cord layers are laid so that the individual cord layers form an angle of 15°–20°.

A diagonal belt tire is a combination of a diagonal and a radial tire. The cord angle on the diagonally constructed casing is about 40°. Between the casing and the tread of the tire there is placed a stabilising belt with an angle of ca. 20°. This type of tire is produced mostly in the U.S.A. where it has the designation "Bias belted", while it is little used in Europe.

The vulcanisation mould according to the present invention is used on tires of the type which are illustrated in FIG. 1, and which are referred to in the introduction of this specification.

Figure 2:
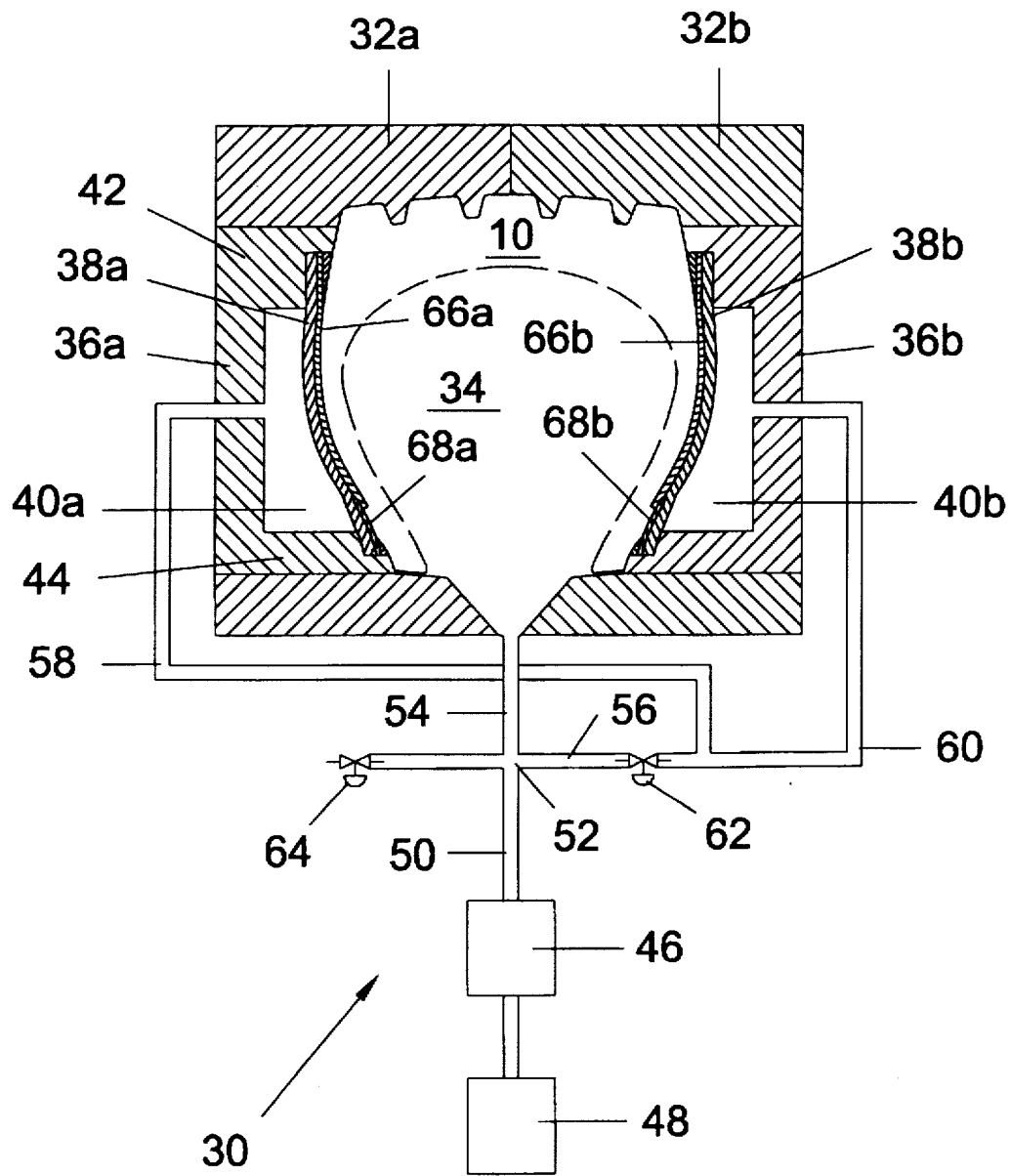
FIG. 2 shows a cross-section (that is to say the one half) of a vulcanising mould according to the present invention.
Figure 3:
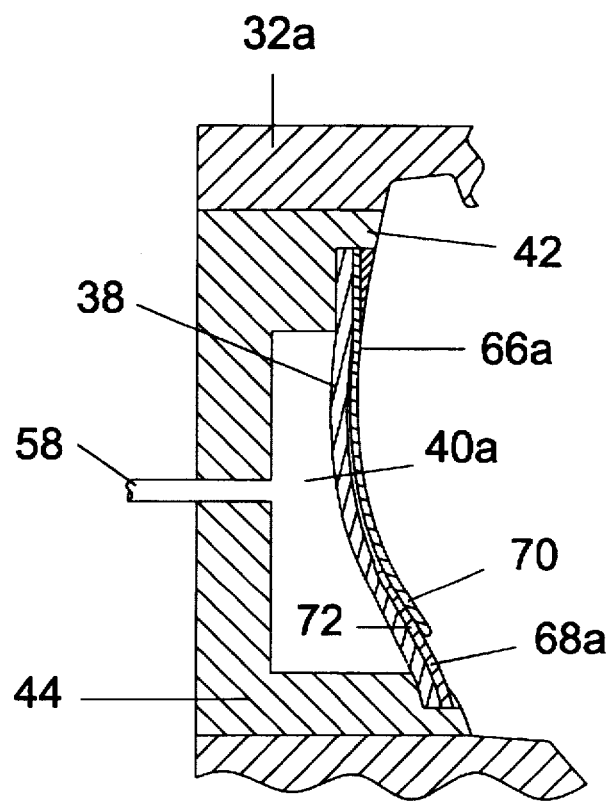
FIG. 3 shows an enlarged section of the left half of the vulcanisation mould according to the invention.
Figure 3A:
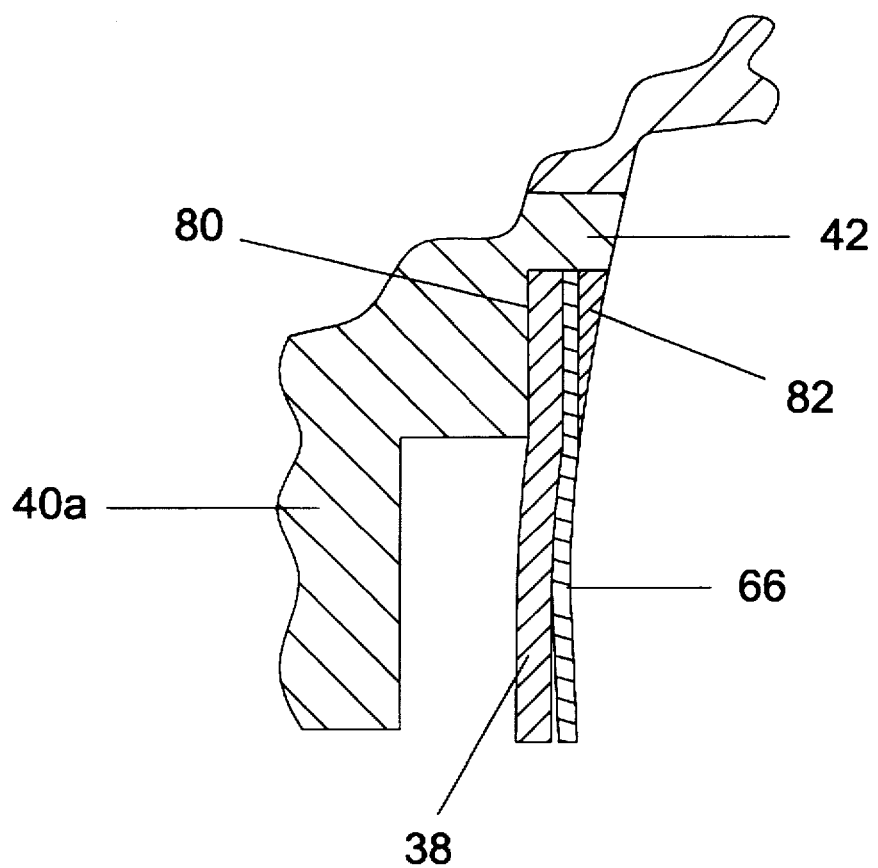
FIG. 3a shows an enlarged section of the mould in order to illustrate how the plates which during the vulcanisation are to be arranged between the tire sidewall and the membrane, are fastened in the mould.

The vulcanisation mould 30 (that is to say really the matrix of a vulcanisation machine) is illustrated schematically in FIG. 2. The mould 30 comprises two mould halves 32a, 32b which form an annular mould hollow space 34 wherein the tire 10 which is to be vulcanised is mounted. In each of annular sidewall mould portions 36a, 36b of the vulcanisation mould there is formed a continuous circular cavity. An elastic and flexible membrane 38a, 38b formed as an annular disc, is arranged over the cavity. In this way, there is formed a closed annular hollow space 40a, 40b, one on each side of the mould hollow space 34, and each of these is defined by the sidewall mould portion and the membrane. The membranes 38a, 38b can according to one embodiment be pressed into the annular groove in the metal material in the respective inner 42 and outer 44 surfaces of the mould portions 36a, 36 b and fastened in a suitable manner. As shown in FIG. 2, protective pairs of metal plates 66, 68 are placed behind and against each membrane 68a, 38b relative to the hollow spaces 40a, 40b. Referring to FIGS. 2 and 3a, the most preferred solution to mount the membrances 38a, 38 b is to mount both the membrane 38 and and plates 66, 68 to the mould material at 42 (and 44) by installing and fixing their peripheral fastening edges in a hook-shaped formation 80 (FIG. 3a) of the mould. The fixing can be done by tightening an annular clamping ring 82, for example of metal, in towards the hook formation 80 over the membrane 38 and the element 66, 68 which are thereby clamped fast. The clamping ring 82 is designed so that it forms together with the portions of the mould, uniform surface transitions against the tire. With such a fastening solution, membranes and protective plates can be readily released and taken out when they have to be replaced or repaired. The border lines drawn in on FIGS. 2 and 3 between the mould halves 32a,b and between the sidewall mould portion 36a, 36b and the mould halves 32a,b are to illustrate that these apparatus parts of metal can be mutually displaced in parallel and be separated relative to each other in order to install in or take a tire out of the mould. The apparatus according to FIG. 2 really constitutes the inner matrix portion of a greater vulcanising machine, where for one thing there are designed in the external machine parts (which are not shown in the Figure) ducts for steam having higher temperatures in order to heat up the vulcanising rubber.

The membranes have a breadth which corresponds in height to sidewalls 14a, 14b of the tire 10, and have a suitable thickness. The membranes can be made of a partially elastic, plate-formed material, and are preferably of a rubber material. The protective plates can have a small thickness since they are not exposed to tensile forces. Thus, the thickness can be from 0.1 millimeter and up to 5 millimeters, and a thickness of ca. 1.0 mm will normally be well suited depending upon what one finds most appropriate for the dissimilar plate materials and tire dimensions.

Referring to FIG. 2, a means is also provided for regulating the pressure in the mould hollow space 34 relative to the pressure in the two peripheral annular hollow spaces 40a, 40b. This means includes a pump 46 and respective conduits 54, 58, 60 which communicate with the respective hollow space 34 and annular spaces 40a, 40b to deliver a pressurized medium thereto.

With the pump 46 fluid can be conducted from a source 48 through a conduit 50 to a branching point 52 from which the first conduit 54 leads in to the mould hollow space 34, while a second conduit 56 is further branched into the two conduits 58, 60 which lead in to the respective outer annular spaces. When a tire is to be vulcanised, it is placed in the mould as is illustrated by the broken line in FIG. 2. Fluid (in the form of air) is pumped into the mould hollow space 34 to a pressure P1 while the outer peripheral ring spaces 40a,b are pressure set to a pressure P2. By adjusting a control valve 62 the pressure is mutually adjusted in the two circuits so that the mould hollow space pressure P1 is higher than the annular space pressure P2. Thereby, as a consequence of the excess pressure, sidewalls 14 of the tire will be flexed outwards and thrust against the membranes. When the vulcanisation is complete the pressure relief from the hollow spaces occurs via a discharge valve 64.

According to the invention, vulcanisation of the membrane 38 fast to the sides of the tire is avoided by arranging the pairs of annular disc-shaped plate elements 66, 68 on the inside of each membrane, that is to say in towards the mould hollow space 34. Reference is also made here to FIG. 3 which illustrates an enlarged section of the mould of FIG. 2. Each pair of plate elements is split up in the circular plane into two annular disc plates 66a, 68a where the one annular disc plate 66a is fastened at outer diameter 42 of the mould, while the other annular disc plate 68a is fastened at the inner diameter 44 of the mould. The annular disc plates are preferably split up in the circular plane so that the inner peripheral edge 70 of the annular disc plate 66a which is fastened to the outer periphery 42 of the mould, overlaps the outer peripheral edge 72 of the annular disc plate 68a which is fastened in the inner periphery 44 of the mould. In addition to the splitting up in the circumferential plane with overlapping, the plates are also split up and overlap each other in the radial plane. On operation of the apparatus the plates also become situated between the rubber membrane 38 and the external side wall 14 of the tire.

According to an alternative solution, the radially split up plate 66a extends from the outer periphery 42 (FIG. 3) and completely down to the inner periphery 44. In this instance the free lower edge of the plate 66a will, on operation of the apparatus, slide between the tire and the metal material of the mould. Alternatively, the radially split up inner plate 68a can have such a design where it projects completely up to the outer periphery of the mould. In such an instance a construction is possible where the split up protecting plate only partially stretches over the membrane.

It is also possible that there are certain portions of the tire not needing to bear against a protecting plate, that is to say that it can make direct contact with the membrane 38a.

According to a further construction the plates can only be fixed above (alternatively below) and lie free in a groove below (alternatively upper) where they are largely freely movable.

Figure 4:
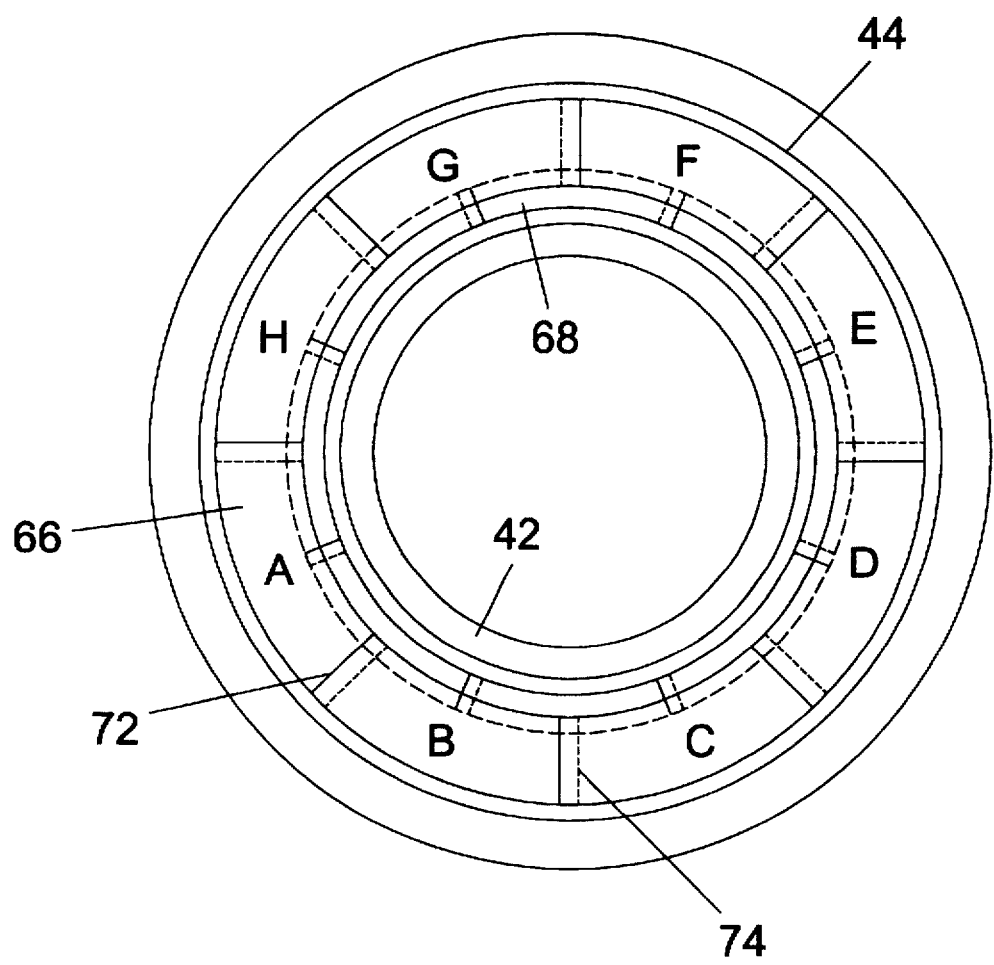
FIG. 4 shows in a radial section the membrane protective plates in order to illustrate how the plates can be arranged in overlapping relationship, according to an embodiment of the invention.

The splitting up of the annular disc plates is more clearly evident from FIG. 4 which shows a plan view in a direction outwards from interior 34 of the mould and shows outer 42 and inner 44 "diameter" of the mould plus the annular disc-shaped protecting plates 66a, 68a. The plates in the circular plane are split up into two plates, as explained in connection with FIG. 3. Furthermore, in the radial plane, both the outer plate 66a and the inner plate 68a are split up into a number of smaller plates, such as 8 plates as is illustrated by A–H for the outer plate 66 (one shall not be tied to the construction with 8 plates which is illustrated in FIG. 3). The full lines show one visible edge of each part plate (A–H), while the dotted lines show the one end edge which lies overlapping and concealed under the next plate in the series. Thus for example the one visible end edge of the plate A lies at 72 while the other end edge 74 lies under the next plate B in the series.

As is illustrated in FIG. 4 the radial splitting up of the interior plate is displaced relative to the radial splitting up of the exterior plate. This is done so that the plates shall not impede one another's movements during the use of the apparatus. For example the thrusting against each other of edge portions of the plates is avoided during said movement of the plates.

While the membrane is formed of an elastic and flexible material, such as rubber, the plate-shaped membrane-protecting elements 66a, 68a are made of a non-elastic material, but bendable (less rigid) material. A plate material of metal or plastic will be well suited. The plate material is preferably made of metal, and especially of aluminium or steel. These metals exhibit low or no adhesion capability towards vulcanising rubber.

When a tire 10 is mounted in the mould the outer side surfaces of the tire side walls 14 will consequently form an abutment against the membrane-protecting elements 66, 68. When the pressure in the mould hollow space 34 increases to the necessary level above the pressure in the annular spaces 40a, 40b, the tire sides 14 are pushed somewhat outwards in order to try to reestablish the pressure equilibrium. While the rubber membrane is flexed outwardly and is stretched as a result of its elasticity, the protecting plates will only be flexed outwardly in the same degree. But the plates will not be able to be stretched because of lacking the elasticity, and the respective outer and inner peripheral edges 70, 72 will then relatively speaking be mutually displaced each in its respective direction, sliding against each other. The plates are dimensioned with such a breadth that the end edges will not slide from each other during the outward flexing, and therefore there will not be formed any gap between the plates.

When the vulcanisation is complete, the pressure is relieved and the tire is taken out of the mould.

As a result of the protection plates of metal exhibiting higher rigidity, there is achieved the occurrence of a pressure balancing during the vulcanisation when the membrane presses the protecting plates towards the tire sidewalls. There will arise a transport/outward flow of the uneven unvulcanised rubber from regions with higher abutment pressure to regions with lower abutment pressure. In this way cuts or concavities in the side faces of the tire will be filled up by flowable rubber material, and the side of the tire is smoothed out as a result of the tire impacting against a material which is more rigid than rubber. In addition the earlier problem with rubber material which vulcanises fast in the membrane is avoided. The rubber material has as mentioned a much lower adhesion to aluminium than to the membrane of rubber.

By the present invention there is consequently achieved a big advance in the vulcanisation of tires.

I claim:

1. Pressure compression mould for producing or revulcanizing of tires where the compression mould comprises separable mould halves which combined form an inner pressure- and temperature-regulatable annular hollow space adapted for arrangement of a tire, the mould halves comprising respective sidewall mould portions, a part of each of the sidewall mould portions is formed with an elastic and flexible annular disc membrane which on placing the tire in the mould, is adjacent to a respective outer tire sidewall, characterized in said sidewall mould portions of the compression mould having a plurality of flexible and non-elastic plates having a dimension such that the membrane sides facing towards the hollow space are largely covered by the plates, and adjacent plates having free edge portions arranged so that they mutually overlap each other, whereby the plates prevent contact between the tire and the membrane.

2. Pressure compression mould in accordance with claim 1, characterized in that the plates overlap radially thereof and circumferentially thereof.

3. Pressure compression mould in accordance with claim 1, characterized in that the plates are arranged in the respective outer and inner peripheries of the mould.

4. Pressure compression mould in accordance with any one of claims 1 to 3 characterized in that the plates are formed by splitting up an annular plate element, in the circumferential plane, into respective annular outer and inner part plates, and the two part plates are further split up in the radial plane into a series of outer plates and a series of inner plates respectively, and each plate in the series overlaps the next plate in the series, and that the plates in the respective outer and inner series mutually overlap each other.

5. Pressure compression mould in accordance with claim 4 characterized in that the radial splitting up of the inner plate is displaced relative to the radial splitting up of the outer plate.

6. Pressure compression mould in accordance with claim 4 characterized in that a plurality of the plates having a radially directed overlapping splitting up, extend from the outer periphery of the compression mould and completely down to the inner periphery of the compression mould so that the inner peripheral edge of the plate becomes situated between the tire and the material of the mould half.

7. Pressure compression mould in accordance with claim 1 characterized in that the plates are of a material which exhibits low or no attachment capability towards vulcanizing rubber.

8. Pressure compression mould in accordance with claim 7 characterized in that the plates are of a metal.

9. Pressure compression mould in accordance with claim 1 characterized in that the plates have a thickness in the region of 0.1–5 mm.

10. Pressure compression mould in accordance with claim 1 further comprising said sidewall mould portions each having a pressure- and temperature- regulatable peripheral annular space where each said membrane defines a respective peripheral annular space separated from the hollow space, and means for regulating the pressure in the mould hollow space relative to the pressure in the peripheral annular spaces.

11. A vulcanizing mould for a tire comprising a pair of mould halves defining an annular hollow space to receive a tire, each mould half having an annular cavity facing said hollow space;

a pair of annular elastic membranes, each membrane being mounted over said cavity in a respective mould half; and a plurality of flexible non-elastic plates mounted over each of said membranes in facing relation to said hollow space to face a sidewall of a tire in said hollow space to prevent contact between a tire sidewall and a respective membrane, said plates being disposed in overlapping relation to each other to accommodate flexing of said membranes.

12. A mould as set forth in claim 11 further comprises a first conduit communicating with said hollow space, a second conduit communicating with said cavity in one of said mould halves, a third conduit communicating with said cavity in the other of said mould halves and a pump connected to each said conduit for delivering a pressure medium thereto.

13. A mould as set forth in claim 12 which further comprises a branch conduit connecting said second conduit and said third conduit in parallel and a valve in said branch conduit to reduce the pressure of the pressure medium in each said cavity relative to the pressure medium in said hollow space.

14. A mould as set forth in claim 11 wherein said plates are disposed in radially overlapping relation.

15. A mould as set forth in claim 11 wherein said plates are disposed in circumferential overlapping relation.

* * * * *